United States Patent
Kim et al.

(10) Patent No.: US 12,555,810 B2
(45) Date of Patent: Feb. 17, 2026

(54) METHOD FOR MANUFACTURING POLYMER ELECTROLYTE MEMBRANE, AND ELECTROLYTE MEMBRANE MANUFACTURED BY SAME

(71) Applicant: KOLON INDUSTRIES, INC., Seoul (KR)

(72) Inventors: Na Young Kim, Seoul (KR); Dong Hoon Lee, Seoul (KR); Eun Su Lee, Seoul (KR); Jung Hwa Park, Seoul (KR); Hye Song Lee, Seoul (KR)

(73) Assignee: KOLON INDUSTRIES, INC, Seoul (KR)

( * ) Notice: Subject to any disclaimer, the term of this patent is extended or adjusted under 35 U.S.C. 154(b) by 900 days.

(21) Appl. No.: 17/778,843

(22) PCT Filed: Sep. 28, 2021

(86) PCT No.: PCT/KR2021/013275
§ 371 (c)(1),
(2) Date: Mar. 5, 2023

(87) PCT Pub. No.: WO2022/071732
PCT Pub. Date: Apr. 7, 2022

(65) Prior Publication Data
US 2023/0006232 A1    Jan. 5, 2023

(30) Foreign Application Priority Data

Sep. 29, 2020  (KR) .................. 10-2020-0127287
Sep. 27, 2021  (KR) .................. 10-2021-0127503

(51) Int. Cl.
*H01M 8/1058*    (2016.01)
*H01M 8/1004*    (2016.01)
*H01M 8/1069*    (2016.01)

(52) U.S. Cl.
CPC ....... *H01M 8/1058* (2013.01); *H01M 8/1004* (2013.01); *H01M 8/1069* (2013.01); *H01M 2300/0082* (2013.01)

(58) Field of Classification Search
CPC ............ H01M 8/1058; H01M 8/1004; H01M 8/1069; H01M 2300/0082; H01M 2008/1095; Y02P 70/50; Y02E 60/50
See application file for complete search history.

(56) References Cited

U.S. PATENT DOCUMENTS

2003/0059657 A1    3/2003  Stone
2011/0076595 A1    3/2011  Matsuda
(Continued)

FOREIGN PATENT DOCUMENTS

CN    1623639 A    6/2005
CN    1965425 A    5/2007
(Continued)

OTHER PUBLICATIONS

The CN Office Action, dated Sep. 30, 2023.
(Continued)

*Primary Examiner* — Daniel S Gatewood
(74) *Attorney, Agent, or Firm* — Harvest IP Law, LLP

(57) ABSTRACT

The present disclosure relates to a method for manufacturing a polymer electrolyte membrane, the method comprising the steps of (a) preparing a porous support containing a plurality of pores, (b) preparing an ion conductor dispersion solution by dispersing an ion conductor in a dispersion medium, (c) contacting the dispersion medium with the porous support to wet the dispersion medium on the porous support, and (d) introducing the ion conductor to at least one surface of the porous support by applying the ion conductor dispersion
(Continued)

solution to the porous support wetted with the dispersion medium, and a polymer electrolyte membrane manufactured thereby.

10 Claims, 2 Drawing Sheets

(56) References Cited

U.S. PATENT DOCUMENTS

| | | | |
|---|---|---|---|
| 2012/0107721 A1 | 5/2012 | Onuma | |
| 2013/0084516 A1 | 4/2013 | Schoeneweiss | |
| 2017/0179514 A1* | 6/2017 | Bae | H01M 8/1081 |
| 2019/0312287 A1* | 10/2019 | Kim | H01M 8/0271 |

FOREIGN PATENT DOCUMENTS

| | | |
|---|---|---|
| CN | 108242553 A | 7/2018 |
| CN | 110112351 A | 8/2019 |
| CN | 111164813 A | 5/2020 |
| CN | 111613756 A | 9/2020 |
| JP | 2006-019273 A | 1/2006 |
| JP | 2008-146859 A | 6/2008 |
| JP | 2017511589 A | 4/2017 |
| JP | 2019192624 A | 10/2019 |
| JP | 2021525450 A | 9/2021 |
| KR | 1020060001628 A | 1/2006 |
| KR | 10-2006-0083372 A | 7/2006 |
| KR | 100644859 B1 | 11/2006 |
| KR | 20120111395 A | 10/2012 |
| KR | 20130013747 A | 2/2013 |
| KR | 101339702 B1 | 12/2013 |
| KR | 10-2008400 B1 | 8/2019 |
| KR | 20200002693 A | 1/2020 |
| KR | 20200033630 A | 3/2020 |
| KR | 102130873 B1 | 7/2020 |
| TW | I487736 B | 6/2015 |
| WO | 2015-059848 A1 | 4/2015 |
| WO | 2016-148017 A1 | 9/2016 |

OTHER PUBLICATIONS

European Search Report dated Nov. 4, 2024.
The CN Office Action, dated Oct. 25, 2023.
The JP Office Action, dated Aug. 2, 2023.
The KR Office Action, dated Jan. 18, 2024.
The JP Notice of Allowance, dated Jul. 23, 2024.
CN Decision on Rejection, dated Jul. 31, 2024.

\* cited by examiner

METHOD FOR MANUFACTURING POLYMER ELECTROLYTE MEMBRANE, AND ELECTROLYTE MEMBRANE MANUFACTURED BY SAME

CROSS-REFERENCE TO RELATED APPLICATION

This application is the National Stage filing under 35 U.S.C. 371 of International Application No. PCT/KR2021/013275, filed on Sep. 28, 2021, and claims priority to Korean Patent Application No. 10-2020-0127287, filed on Sep. 29, 2020.

TECHNICAL FIELD

The present disclosure relates to a method for manufacturing a polymer electrolyte membrane and a polymer electrolyte membrane manufactured thereby, and more particularly, to a method for manufacturing a polymer electrolyte membrane having improved ionic conductivity performance while improving impregnation properties of an ion conductor, and a polymer electrolyte membrane manufactured thereby.

BACKGROUND ART

Fuel cells are batteries provided with a power generation system that directly converts chemical reaction energy such as oxidation/reduction reaction of hydrogen and oxygen contained in hydrocarbon-based fuel materials such as methanol, ethanol, and natural gas into electrical energy, and are in the spotlight as a next-generation clean energy source that can replace fossil energy due to their eco-friendly characteristics with high energy efficiency and low pollutant emission.

Such fuel cells have the advantage of being able to output a wide range of outputs with a stack configuration by stacking of unit cells, and exhibit 4 to 10 times the energy density compared to small lithium batteries so that they are attracting attention as small and mobile portable power sources.

A stack that actually generates electricity in a fuel cell has a structure in which several to tens of unit cells composed of a membrane-electrode assembly (MEA) and a separator (also called a bipolar plate) are stacked. In general, the membrane-electrode assembly has a structure in which an anode or fuel electrode and a cathode or air electrode are respectively disposed at both sides thereof with the electrolyte membrane being between them.

Fuel cells may be divided into an alkaline electrolyte fuel cell, a polymer electrolyte membrane fuel cell (PEMFC), etc. depending on the state and type of electrolyte. The polymer electrolyte membrane fuel cell among them is in the spotlight as a portable, vehicle, and home power supply device due to its advantages such as a low operating temperature of less than 100° C., fast start-up and response characteristics, and excellent durability.

Typical examples of the polymer electrolyte membrane fuel cell may include a proton exchange membrane fuel cell (PEMFC) using hydrogen gas as a fuel and a direct methanol fuel cell (DMFC) using liquid methanol as a fuel.

To summarize the reaction that occurs in a polymer electrolyte membrane fuel cell, first, when a fuel such as hydrogen gas is supplied to the anode, hydrogen ions ($H^+$) and electrons ($e^-$) are generated by the oxidation reaction of hydrogen at the anode. The generated hydrogen ions are transferred to the cathode through the polymer electrolyte membrane, and the generated electrons are transferred to the cathode through an external circuit. Oxygen is supplied to the cathode, and oxygen is combined with hydrogen ions and electrons to produce water by the reduction reaction of oxygen.

Meanwhile, in order to realize the commercialization of the polymer electrolyte membrane fuel cell, there are still many technical barriers to be solved, and essential improvement factors include the realization of high performance, long life, and production cost reduction. The component that has the greatest influence on this is the membrane-electrode assembly, and among them, the polymer electrolyte membrane is one of the key factors that have the greatest influence on the performance and price of the membrane-electrode assembly.

Requirements of the polymer electrolyte membrane required for operation of the polymer electrolyte membrane fuel cell include high hydrogen ion conductivity, chemical stability, low fuel permeability, high mechanical strength, low moisture content, excellent dimensional stability, and the like. Conventional polymer electrolyte membranes tend to be difficult to normally exhibit high performance in a specific temperature and relative humidity environment, particularly in high temperature/low humidification conditions. Due to this, the polymer electrolyte membrane fuel cell to which the conventional polymer electrolyte membrane is applied is limited in its use range.

In order to simultaneously secure the performance, durability, and mechanical and chemical properties of such a polymer electrolyte membrane, the development of a reinforced composite membrane-type polymer electrolyte membrane to which a reinforcing material is applied has been progressed. However, when a reinforcing material is introduced to improve the mechanical durability of the electrolyte membrane, the resistance loss increases, and the ionic conductivity of the electrolyte membrane decreases so that, as a result, there is a disadvantage in that the performance of a fuel cell comprising the same may be decreased.

Meanwhile, the reinforced composite membrane is manufactured by immersing a porous reinforcing material in a dispersion solution in which an ion conductor is dispersed, or formed by additionally adding an ion conductor layer to one or both surfaces thereof.

At this time, if the porous reinforcing material is not sufficiently impregnated with the ion conductor, vacant pores interfere with hydrogen ion conduction to lower the hydrogen ionic conductivity, and there is a problem in that this acts as a factor to deteriorate the performance of the fuel cell.

Therefore, it is important to improve the impregnation rate of the reinforced composite membrane in order to prevent a decrease in hydrogen ion conductivity while improving the mechanical durability of the polymer electrolyte membrane. In order to commercialize the polymer electrolyte membrane, mechanical durability should be improved by increasing dimensional stability during wet drying along with high performance. To this end, it is required to secure the optimal structure of the reinforced composite membrane and to improve the ionic conductivity together.

DISCLOSURE

Technical Problem

An object of the present disclosure to provide a method for manufacturing a polymer electrolyte membrane that has excellent morphological stability to improve mechanical durability of the electrolyte membrane and the impregnation rate of the polymer electrolyte membrane at the same time so that it has excellent ionic conductivity and can reduce hydrogen permeability.

Another object of the present disclosure is to provide an electrolyte polymer membrane manufactured through the method for manufacturing the polymer electrolyte membrane.

Another object of the present disclosure is to provide a membrane-electrode assembly comprising the polymer electrolyte membrane.

Another object of the present disclosure is to provide a fuel cell comprising the membrane-electrode assembly.

Technical Solution

An embodiment of the present disclosure provides a method for manufacturing a polymer electrolyte membrane, the method comprising the steps of
(a) preparing a porous support containing a plurality of pores,
(b) preparing an ion conductor dispersion solution by dispersing an ion conductor in a dispersion medium,
(c) contacting the dispersion medium with the porous support to wet the dispersion medium on the porous support, and
(d) introducing the ion conductor to at least one surface of the porous support by applying the ion conductor dispersion solution to the porous support wetted with the dispersion medium.

The step (c) may be contacting a dispersion medium of a gas state with the porous support.

The step (c) may be performed in a chamber to which the dispersion medium of a gas state is supplied.

The chamber may have an internal temperature of 60° C. to 100° C.

The chamber may have an internal relative humidity (RH) of 50% to 120%.

The dispersion medium and the porous support in the step (c) may be in contact for 0.1 minutes to 60 minutes.

The dispersion medium may include water, ethanol, isopropyl alcohol, n-propyl alcohol, butyl alcohol, N,N-dimethylacetamide, N,Ndimethyl formamide, dimethylsulphoxide, N-methyl-2-pyrolidone, triethyl phosphate, methyl ethyl ketone, tetrahydrofuran, acetone, and combinations thereof.

The method for manufacturing the polymer electrolyte membrane may further comprise a step (e) of drying the porous support to which the ion conductor has been introduced at 40° C. to 120° C.

Another embodiment of the present disclosure provides a polymer electrolyte membrane manufactured by the manufacturing method.

Another embodiment of the present disclosure provides a membrane-electrode assembly comprising an anode electrode and a cathode electrode which are positioned opposite to each other, and the polymer electrolyte membrane which is positioned between the anode electrode and the cathode electrode.

Another embodiment of the present disclosure provides a fuel cell comprising the membrane-electrode assembly.

Advantageous Effects

The method for manufacturing a polymer electrolyte membrane according to the present disclosure can realize a polymer electrolyte membrane which improves the mechanical durability of the electrolyte membrane and has excellent ionic conductivity at the same time by improving ion conductor impregnation properties of the porous support.

BEST MODE FOR CARRYING OUT THE INVENTION

Figure 1:
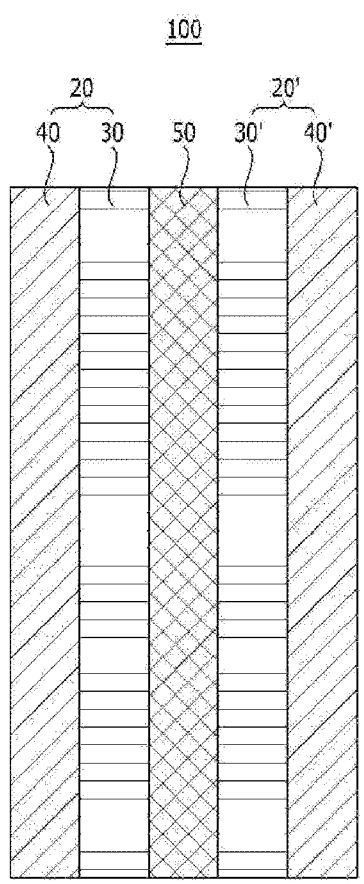
FIG. 1 is a cross-sectional view schematically showing a membrane-electrode assembly according to an embodiment of the present disclosure.

Hereinafter, embodiments of the present disclosure will be described in detail so that the present disclosure can be easily realized by those skilled in the art to which the present disclosure pertains. However, the present disclosure can be implemented in various different forms and is not limited to the embodiments described herein.

Terms and words used in the present specification are terms selected in consideration of functions in the embodiments, and the meaning of the terms may vary according to the intention or custom of the invention. Therefore, the terms used in the embodiments to be described later, when specifically defined in the present specification, follow the definition, and when there is no specific definition, they should be interpreted as a meaning generally recognized by those skilled in the art.

In order to clearly express the various layers and regions in the drawings, the thickness is enlarged and the same reference numerals are given to similar parts throughout the specification. When a part, such as a layer, film, region, plate, etc., is "on" other part, it includes not only the case where the part is "directly on" the other part, but also the case where another part is in the middle therebetween. Conversely, when a part is "just above" other part, it mean that there is no another part in the middle therebetween.

Hereinafter, a method for manufacturing a polymer electrolyte membrane according to an embodiment will be described.

The present disclosure the present disclosure relates to a method for manufacturing a polymer electrolyte membrane capable of minimizing deterioration in the physical durability of an electrolyte membrane due to repetition of humidification and drying conditions in the driving process of a fuel cell and improving the ionic conductivity and performance of the electrolyte membrane, and a polymer electrolyte membrane manufactured thereby.

Specifically, the method for manufacturing a polymer electrolyte membrane according to an embodiment of the present disclosure comprises the steps of (a) preparing a porous support containing a plurality of pores, (b) preparing an ion conductor dispersion solution by dispersing an ion conductor in a dispersion medium, (c) contacting the dispersion medium with the porous support to wet the dispersion medium on the porous support, and (d) introducing the ion conductor to at least one surface of the porous support by applying the ion conductor dispersion solution to the porous support wetted with the dispersion medium.

First, a porous support containing a plurality of pores is prepared.

The porous support may include, as an example, a highly fluorinated polymer having excellent resistance to thermal and chemical decomposition, preferably a perfluorinated polymer. For example, the porous support may be a copolymer of polytetrafluoroethylene (PTFE) or tetrafluoroethylene and $CF_2=CFC_nF_{2n+1}$ (n is a real number of 1 to 5) or $CF_2=CFO-(CF_2CF(CF_3)O)_mC_nF_{2n+1}$ (m is a real number of 0 to 15, and n is a real number of 1 to 15).

Since the PTFE is commercially used, it may be suitably used as the porous support. Further, an expanded polytetrafluoroethylene polymer (e-PTFE) having a microstructure of polymer fibrils or a microstructure in which nodes are connected to each other by fibrils may also be suitably used as the porous support, and a film having a microstructure of polymer fibrils in which the nodes are not present may also be suitably used as the porous support.

The porous support comprising the perfluorinated polymer may be manufactured into a more porous and stronger porous support by extrusion-molding dispersion polymerized PTFE onto a tape in the presence of a lubricant and stretching the material obtained thereby. Further, the amorphous content of PTFE may be increased by heat-treating the e-PTFE at a temperature exceeding a melting point (about 342° C.) of the PTFE. The e-PTFE film manufactured by the above-mentioned method may have micropores having various diameters and porosities. The e-PTFE film manufactured by the above-mentioned method may have pores of at least 35%, and the micropores may have a diameter of about 0.01 μm to 1 μm.

As another example of the porous support, the porous support may be a nonwoven fibrous web.

The nonwoven fibrous web refers to a sheet having a structure of individual fibers or filaments that are interlaid, but not in the same manner as a woven fabric. The nonwoven fibrous web may be manufactured by any one method selected from the group consisting of carding, garneting, air-laying, wet-laying, melt blowing, spunbonding, and stitch bonding.

The fiber may include one or more polymer materials, any material used as a fiber-forming polymer material can be generally used, and specifically, a hydrocarbon-based fiber-forming polymer material may be used. For example, the fiber-forming polymer material may include any one selected from the group consisting of: polyolefins such as polybutylene, polypropylene and polyethylene; polyesters such as polyethylene terephthalate and polybutylene terephthalate; polyamides (nylon-6 and nylon-6,6); polyurethane; polybutene; polylactic acid; polyvinyl alcohol; polyphenylene sulfide; polysulfone; fluid crystalline polymers; polyethylene-co-vinyl acetate; polyacrylonitrile; cyclic polyolefins; polyoxymethylene; polyolefin-based thermoplastic elastomers; and combinations thereof, but is not limited thereto.

As another example of the porous support in the form of a nonwoven fibrous web, the porous support may include a nanoweb in which nanofibers are integrated in the form of a nonwoven fabric containing a plurality of pores.

A hydrocarbon-based polymer which exhibits excellent chemical resistance and has hydrophobicity so that there is no risk of morphological deformation due to moisture in a high-humidity environment may be preferably used as the nanofiber. Specifically, the hydrocarbon-based polymer may include one which is selected from the group consisting of nylon, polyimide, polyaramid, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamideimide, polyethylene terephthalate, polyphenylene sulfide, polyethylene, polypropylene, copolymers thereof, and mixtures thereof, and may preferably include polyimide having more excellent heat resistance, chemical resistance, and morphological stability among them.

The nanoweb is a nanofiber aggregate in which nanofibers manufactured by electrospinning are arranged. At this time, the nanofibers preferably have an average diameter of 40 nm to 5,000 nm when calculating the average of the fiber diameters by measuring 50 fiber diameters using a scanning electron microscope (JSM6700F, JEOL) in consideration of the porosity and thickness of the nanoweb. If the average diameter of the nanofibers is less than 40 nm, the mechanical strength of the porous support may be reduced, and if the average diameter of the nanofibers exceeds 5,000 nm, the porosity may be remarkably dropped and the thickness may be increased.

The nonwoven fibrous web may have a basic weight of 5 mg/cm$^2$ to 30 mg/cm$^2$. When the basic weight of the nonwoven fibrous web is less than 5 mg/cm$^2$, visible pores are formed so that it may be difficult for the nonwoven fibrous web to function as a porous support, and when it exceeds 30 mg/cm$^2$, it may be manufactured in a paper or fabric form in which pores are hardly formed.

The porous support may have a porosity of 45% or more, specifically 60% or more. Meanwhile, the porous support preferably has a porosity of 90% or less. If the porous support has a porosity of exceeding 90%, morphological stability may be lowered so that the post-process may not proceed smoothly. The porosity may be calculated by the ratio of the air volume to the total volume of the porous support according to Equation 1 below. In this case, the total volume may be calculated by manufacturing a rectangular sample and measuring the width, length, and thickness thereof, and the air volume may be obtained by measuring the mass of the sample and then subtracting the polymer volume inversely calculated from the density from the total volume.

Porosity (%)=(volume of air in the porous support/total volume of the porous support)×100    [Equation 1]

The porous support may have a thickness of 0.1 μm to 100 μm specifically 1 μm to 50 μm. When the porous support has a thickness of less than 0.1 μm, physical durability may decrease as the mechanical strength of the electrolyte membrane comprising the porous support decreases, and as the fuel cell driving system is humidified, the electrolyte membrane may swell and stability may be reduced. When the porous support has a thickness of exceeding 100 μm, resistance loss of the electrolyte membrane may increase, and weight lightening and integration may be deteriorated.

Next, an ion conductor dispersion solution is prepared by dispersing an ion conductor in a dispersion medium.

The ion conductor may be a cation conductor having a cation exchange group such as proton, or an anion conductor having an anion exchange group such as a hydroxy ion, carbonate, or bicarbonate.

The cation exchange group may be any one selected from the group consisting of a sulfonic acid group, a carboxyl group, a boronic acid group, a phosphoric acid group, an imide group, a sulfonimide group, a sulfonamide group, a sulfonic acid fluoride group, and combinations thereof, and may generally be a sulfonic acid group or a carboxyl group.

Examples of the cation conductor may include: a fluoro-based polymer which contains the cation exchange group and contains fluorine in the main chain; a hydrocarbon-based polymer such as benzimidazole, polyamide, polyamideimide, polyimide, polyacetal, polyethylene, polypropylene, acrylic resin, polyester, polysulfone, polyether, polyetherimide, polyester, polyethersulfone, polyetherimide, polycarbonate, polystyrene, polyphenylene sulfide, polyether ether ketone, polyether ketone, poly(aryl ether sulfone), polyphosphazene, or polyphenylquinoxaline; a partially fluorinated polymer such as polystyrene-graft-ethylenetetrafluoroethylene copolymer or polystyrene-graft-polytetrafluoroethylene copolymer; sulfone imide; and the like.

More specifically, when the cation conductor is a hydrogen ion cation conductor, the polymers may contain a cation exchange group selected from the group consisting of a sulfonic acid group, a carboxylic acid group, a phosphoric acid group, a phosphonic acid group, and derivatives thereof in the side chain, and specific examples of the polymers may include: fluoro-based polymers including poly(perfluorosulfonic acid), poly(perfluorocarboxylic acid), a copolymer of sulfonic acid group-containing tetrafluoroethylene and fluorovinyl ether, defluorinated sulfurized polyether ketone, or mixtures thereof; and hydrocarbon-based polymers including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether nitrile, sulfonated polyarylene ether sulfone ketone, and mixtures thereof, but is not limited thereto.

The anion conductor is a polymer capable of transferring anions such as hydroxy ions, carbonate, or bicarbonate, and the anion conductor is commercially available in the form of a hydroxide or halide (generally chloride), and the anion conductor may be used in industrial water purification, metal separation or catalytic processes, or the like.

The anion conductor may generally include a polymer doped with a metal hydroxide, and specific examples thereof may include a metal hydroxide-doped poly(ethersulfone), polystyrene, vinyl-based polymer, poly(vinyl chloride), poly(vinylidene fluoride), poly(tetrafluoroethylene), poly(benzimidazole), or poly(ethylene glycol).

Specifically, the ion conductor may be a fluorinated polymer, specifically, a highly fluorinated polymer containing a highly fluorinated side chain. The term "highly fluorinated" means that at least 90% by mole of the total number of halogen and hydrogen atoms are substituted with fluorine atoms.

The highly fluorinated polymer contains a polymer skeleton and cyclic side chains attached to the skeleton, wherein the side chains may have the ion exchange functional group. For example, it may be copolymers of a first fluorinated vinyl monomer and a second fluorinated vinyl monomer having a sulfonic acid group.

The first fluorinated vinyl monomer may be tetrafluoroethylene (TFE), hexafluoropropylene, vinyl fluoride, vinylidene fluoride, trifluoroethylene, chlorotrifluoroethylene, perfluoro(alkyl vinyl ether), and mixtures thereof, and the second fluorinated vinyl monomer having a sulfonic acid group may be various fluorinated vinyl ethers having a sulfonic acid group.

Although a dispersion medium for preparing a dispersion solution or dispersion of the ion conductor is not limited as long as it can prepare a dispersion of a uniform composition by dispersing the ion conductor, it may include, for example, one which is selected from water, ethanol, isopropyl alcohol, n-propyl alcohol, butyl alcohol, N,N-dimethylacetamide, N,Ndimethyl formamide, dimethyl sulphoxide, N-methyl-2-pyrolidone, triethylphosphate, methylethylketone, tetrahydrofuran, acetone, and combinations thereof. As a method of dispersing the ion conductor in a solvent, it is possible to use a method that has conventionally generally been known so that a detailed description thereof will be omitted.

Subsequently, the dispersion medium and the porous support are brought into contact to wet the dispersion medium on the porous support.

In the case of a so-called reinforced composite membrane type polymer electrolyte to which a reinforcing material is applied to simultaneously secure the durability and mechanical and chemical properties of the polymer electrolyte membrane in order to realize a high-performance fuel cell, the ionic conductivity of the electrolyte membrane may be secured by forming an ion conductor in micropores of a reinforcing material, that is, a support, but there is a problem in that the ion conductor is not completely impregnated into the micropores of the support so that dead pores are generated, and as a result, the performance of the polymer electrolyte membrane is deteriorated.

The method for manufacturing a polymer electrolyte membrane according to the present disclosure comprises the step of, while introducing a porous support into the electrolyte membrane in order to secure the physical and mechanical properties of an electrolyte membrane, wetting the porous support by first contacting the dispersion medium of the ion conductor dispersion solution with the porous support before introducing the ion conductor into the porous support. Therefore, the ion conductor is impregnated up to the internal pores of the porous support, thereby reducing the generation of dead pores and improving the mobility of the ion conductor to enable the impregnation rate from the surface of the support to be improved.

In an embodiment, the support may be in contact with a dispersion medium of a gas state to wet the porous support. Since the dispersion medium of a gas state may be secured by heating the dispersion medium, and the boiling point (BP) of each dispersion medium may vary depending on the type of dispersion medium, the heating temperature of the dispersion medium is appropriately selected by taking into account the properties of the ion conductor to be introduced and the boiling point of the dispersion medium. As such, when the porous support is wetted through the dispersion medium of a gas state, the dispersion medium is wetted to the inside of the micropores of the porous support so that impregnation properties (wetting) of the ion conductor dispersion solution may be increased, and thus the ionic conductivity of the polymer electrolyte membrane is not reduced, and resistance loss can be prevented.

In an embodiment, the wetting process may be performed in a chamber to which the dispersion medium of a gas state is supplied. The chamber refers to a working space in which the porous support is positioned in the internal space and wetted by the dispersion medium of a gas state. A transfer unit for introducing the porous support or a stage for mounting the porous support may be configured inside the chamber. Further, the chamber may also be provided with a heater capable of heating the interior and a device for temperature control, and may include a supply unit for supplying the dispersion medium, a vacuum pump, a vacuum line, and the like outside of the chamber.

In an embodiment, the chamber may have an internal relative humidity (RH) of 50% to 120%, preferably 70% to 120%. When the chamber has an internal relative humidity of less than 50%, the dispersion medium of a gas state is not transferred to the micropores inside the porous support so that impregnation properties by the ion conductor dispersion solution may decrease, and when the chamber has an internal relative humidity of exceeding 120%, since there may be a problem of stability due to an excessive increase in pressure inside the chamber, and the dispersion medium supplied in the gas state may be condensed back to a high vapor pressure and liquefied, the internal relative humidity of the chamber should be appropriately adjusted within the above range.

In an embodiment, the chamber may have an internal temperature of 40° C. to 120° C., preferably 50° C. to 100° C. When the chamber has an internal temperature of less than 40° C., since the dispersion medium is not vaporized so that it may be difficult to secure a dispersion medium of a gas state, there is a risk that impregnation properties of the ion conductor may be reduced. When the chamber has an internal temperature of exceeding 120° C., since the porous support may be melted to block the micropores, or there may be a problem of stability due to combustion of the dispersion medium of a gas state, the internal temperature of the chamber should be appropriately adjusted within the above range.

In an embodiment, the dispersion medium and the porous support may be in contact for 0.1 minutes to 60 minutes. When the dispersion medium and the porous support are in contact for less than 0.1 minutes, since the contact time of the dispersion medium and the porous support is short so that the porous support is not sufficiently wetted by the dispersion medium, the ion conductor dispersion solution may not be sufficiently impregnated into the porous support, and when the dispersion medium and the porous support are in contact for more than 60 minutes, the dispersion medium may remain in the porous support after being impregnated with the ion conductor dispersion solution due to excessive wetting of the porous support.

Next, an ion conductor dispersion solution is applied to the porous support wetted with the dispersion medium to introduce an ion conductor to at least one surface of the porous support. A method of introducing the ion conductor into a porous support may include a method of spinning the ion conductor dispersion solution onto the porous support, and may be performed through a step of filling the pores of the porous support with the ion conductor by supporting or impregnating the porous support with the ion conductor dispersion solution.

In an embodiment, the method may further comprise a step of drying the porous support into which the ion conductor has been introduced at 40° C. to 120° C., and it may be carried out at a temperature of, for example, 50° C. to 120° C., more preferably 60° C. to 120° C. In this case, the drying temperature may be defined as a temperature of a heat medium supplied for drying or a temperature inside a heat medium and a drying reactor in the drying process. When the drying time is lengthened due to a low drying temperature, since the process efficiency is lowered, the drying temperature is preferably 40° C. or higher in order to prevent this. The drying time in the drying step is not particularly limited, but may be adjusted to 10 minutes to 60 minutes under the drying temperature in consideration of process efficiency and polymer electrolyte membrane's physical properties.

The polymer electrolyte membrane according to another embodiment of the present disclosure may be a polymer electrolyte membrane manufactured by the above manufacturing method.

The polymer electrolyte membrane according to the embodiment may comprise a porous support containing a plurality of pores, and an ion conductor positioned on at least one surface of the porous support. Since the porous support and the ion conductor are the same as described above, detailed descriptions thereof will be omitted.

In the polymer electrolyte membrane according to an embodiment of the present disclosure, while containing a porous support in the electrolyte membrane in order to secure the physical and mechanical properties of the electrolyte membrane, the ion conductor is impregnated in a state that the porous support is wetted by first contacting a solvent used with the dispersion solution of the ion conductor before introducing the ion conductor into the porous support. Therefore, the ion conductor is impregnated up to the internal pores of the porous support to reduce the generation of dead pores, and the mobility of the ion conductor increases to improve the impregnation rate of the ion conductor from the surface of the support so that a polymer electrolyte membrane with excellent performance may be implemented as a result.

According to another embodiment of the present disclosure, there are provided a membrane-electrode assembly comprising the polymer electrolyte membrane, and a fuel cell.

Specifically, the membrane-electrode assembly comprises an anode electrode and a cathode electrode which are positioned to face each other, and the polymer electrolyte membrane which is positioned between the anode electrode and the cathode electrode.

FIG. 1 is a cross-sectional view schematically showing a membrane-electrode assembly according to an embodiment of the present disclosure. Referring to FIG. 1, the membrane-electrode assembly 100 comprises the polymer electrolyte membrane 50 and the fuel cell electrodes 20 and 20' which are respectively disposed on both surfaces of the polymer electrolyte membrane 50. The electrodes 20 and 20' may comprise electrode base materials 40 and 40' and catalyst layers 30 and 30' formed on the surface of the electrode base materials 40 and 40', and may further comprise a microporous layer (not shown) containing conductive fine particles such as carbon powder and carbon black to facilitate material diffusion in the electrode base materials 40 and 40' between the electrode base materials 40 and 40' and the catalyst layers 30 and 30'.

In the membrane-electrode assembly 100, the electrode 20 which is disposed on one surface of the polymer electrolyte membrane 50 to cause an oxidation reaction for generating hydrogen ions and electrons from a fuel transferred to the catalyst layer 30 by passing through the electrode base material 40 is referred to as an anode electrode, and the electrode 20' which is disposed on the other surface of the polymer electrolyte membrane 50 to cause a reduction reaction for producing water from hydrogen ions received through the polymer electrolyte membrane 50 and an oxidizing agent transferred to the catalyst layer 30' by passing through the electrode base material 40' is referred to as a cathode electrode.

The catalyst layers 30 and 30' of the anode and cathode electrodes 20 and 20' contain a catalyst. Any catalyst may be used as the catalyst, as long as it participates in the reaction of the cell to be usable as a catalyst of a normal fuel cell. Specifically, a platinum-based metal may be preferably used.

The platinum-based metal may include one selected from the group consisting of platinum (Pt), palladium (Pd), ruthenium (Ru), iridium (Ir), osmium (Os), a platinum-M alloy (wherein M is one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), a non-platinum alloy, and combinations thereof, and more preferably, combinations of two or more metals selected from the platinum-based catalyst metal group, but is not limited thereto, and any platinum-based catalyst metal usable in the art may be used without limitation.

Specific examples of the platinum alloy may include one selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, or mixtures of two or more thereof.

Further, the non-platinum alloy may include one selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and combinations thereof, or mixtures of two or more thereof.

Such a catalyst may be used as a catalyst itself (black), or may be used by being supported on a carrier.

The carrier may be selected from a carbon-based carrier, a porous inorganic oxide such as zirconia, alumina, titania, silica, ceria, or the like, zeolite. etc. The carbon-based carrier may be selected from graphite, super P, carbon fiber, carbon sheet, carbon black, Ketjen Black, Denka black, acetylene black, carbon nanotube (CNT), carbon sphere, carbon ribbon, fullerene, activated carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and one or more combinations thereof, but is not limited thereto, and any carrier usable in the art may be used without limitation.

The catalyst particles may be positioned on the surface of the carrier, or may penetrate into the carrier while filling the internal pores of the carrier.

When the noble metal supported on the carrier is used as a catalyst, a commercially available one may be used, or one prepared by supporting the noble metal on the carrier may also be used. Since the process of supporting the noble metal on the carrier is a content widely known in the art, although the detailed description is omitted in the present specification, it is a content that may be easily understood by those skilled in the art.

The catalyst particles may be contained in an amount of 20% by weight to 80% by weight based on the total weight of the catalyst electrodes 30 and 30'. When they are contained in an amount of less than 20% by weight, there may be a problem of decreased activity, and when they are contained in an amount of exceeding 80% by weight, the active area is reduced due to aggregation of the catalyst particles, and thus the catalytic activity may be adversely reduced.

Further, the catalyst electrodes 30 and 30' may comprise a binder in order to improve adhesion of the catalyst electrodes 30 and 30' and transfer hydrogen ions. It is preferable to use an ion conductor having ionic conductivity as the binder, and since the description of the ion conductor is the same as described above, a repetitive description will be omitted.

However, the ion conductor may be usable in the form of a single material or a mixture, and may optionally be used together with a non-conductive compound in order to further improve adhesion to the polymer electrolyte membrane 50. It is preferable to adjust the amount used to suit the purpose of use.

Examples of the non-conductive compound may include one or more selected from the group consisting of polytetrafluoroethylene (PTFE), tetrafluoroethylene-hexafluoropropylene copolymer (FEP), tetrafluoroethylene-perfluoroalkyl vinyl ether copolymer (PFA), ethylene/tetrafluoroethylene (ETFE), ethylene chlorotrifluoroethylene copolymer (ECTFE), polyvinylidene fluoride, polyvinylidene fluoride-hexafluoropropylene copolymer (PVdF-HFP), Dodecylbenzenesulfonic acid, and sorbitol.

The binder may be contained in an amount of 20% by weight to 80% by weight based on the total weight of the catalyst electrodes 30 and 30'. When the binder is contained in an amount of less than 20% by weight, the generated ions may not be transferred well, and when it is contained in an amount of exceeding 80% by weight, it is difficult to supply hydrogen or oxygen (air) due to insufficient pores, and the active area capable of being reacted may be reduced.

As the electrode base materials 40 and 40', a porous conductive base material may be used so that hydrogen or oxygen can be smoothly supplied. Typical examples thereof may include carbon paper, carbon cloth, carbon felt, or metal cloth (a porous film composed of a metal cloth of a fiber state or a metal film formed on the surface of a cloth formed of polymer fibers), but is not limited thereto. Further, it is preferable that the electrode base materials 40 and 40' include one which is water repellent treated with a fluorine-based resin since it is possible to prevent a decrease in reactant diffusion efficiency due to water produced when the fuel cell is driven. Examples of the fluorine-based resin may include polytetrafluoroethylene, polyvinylidene fluoride, polyhexafluoropropylene, polyperfluoroalkyl vinyl ether, polyperfluorosulfonylfluoride alkoxyvinyl ether, fluorinated ethylene propylene, polychlorotrifluoroethylene, or copolymers thereof.

Further, a microporous layer for enhancing the reactant diffusion effect in the electrode base materials 40 and 40' may be further comprised. The microporous layer may generally contain a conductive powder having a small particle size, for example, carbon powder, carbon black, acetylene black, activated carbon, carbon fiber, fullerene, carbon nanotube, carbon nanowire, carbon nanohorn, or carbon nanoring.

The microporous layer is prepared by coating the electrode base materials 40 and 40' with a composition comprising a conductive powder, a binder resin, and a solvent. Examples of the binder resin may preferably include polytetrafluoroethylene, polyvinylidene fluoride, polyhexafluoropropylene, polyperfluoroalkyl vinyl ether, polyperfluorosulfonyl fluoride, alkoxyvinyl ether, polyvinyl alcohol, cellulose acetate, or copolymers thereof. Example of the solvent may preferably include alcohol such as ethanol, isopropyl alcohol, n-propyl alcohol, butyl alcohol, or the like, water, dimethylacetamide, dimethyl sulfoxide, N-methylpyrrolidone, tetrahydrofuran, etc. Examples of the coating process may include a screen printing method, a spray coating method, or a coating method using a doctor blade depending on the viscosity of the composition, but is not limited thereto.

The membrane-electrode assembly 100 may be manufactured according to a typical method for manufacturing a membrane-electrode assembly for a fuel cell except that the polymer electrolyte membrane 50 according to the present disclosure is used as the polymer electrolyte membrane 50.

The fuel cell according to another embodiment of the present disclosure may comprise the membrane-electrode assembly 100.

Figure 2:
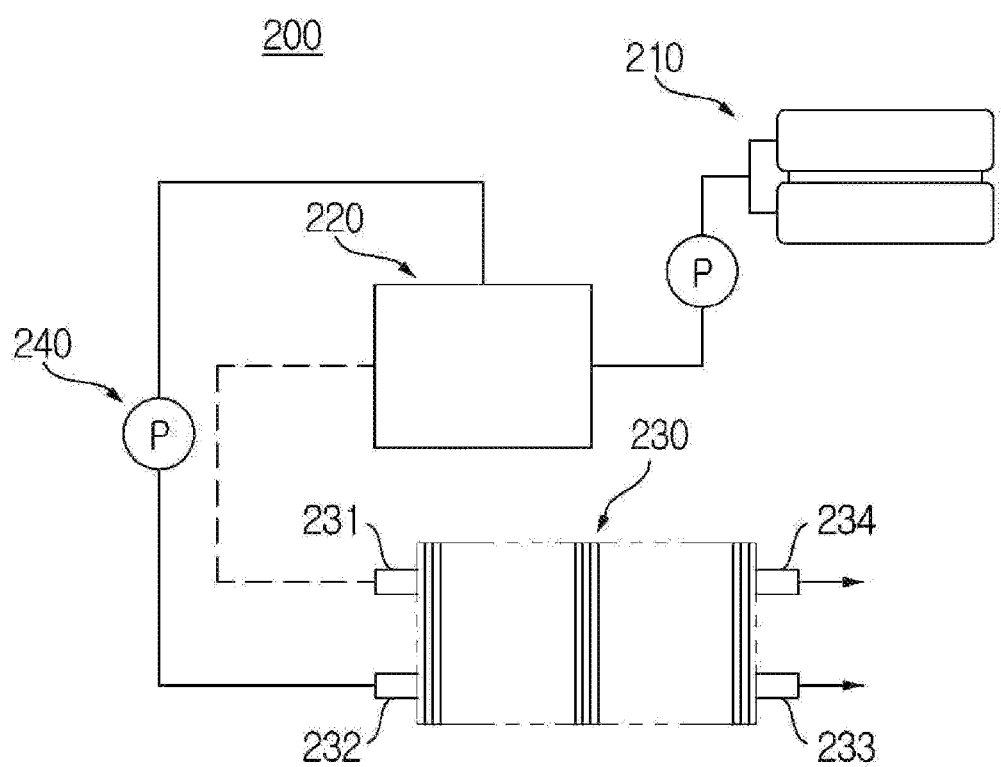
FIG. 2 is a schematic diagram illustrating an overall configuration of a fuel cell according to an embodiment of the present disclosure.

FIG. 2 is a schematic diagram illustrating the overall configuration of the fuel cell.

Referring to FIG. 2, the fuel cell 200 comprises a fuel supply unit 210 for supplying a mixed fuel in which fuel and water are mixed, a reforming unit 220 for generating a reformed gas containing hydrogen gas by reforming the mixed fuel, a stack 230 in which the reformed gas containing hydrogen gas supplied from the reforming unit 220 causes an electrochemical reaction with an oxidizing agent to generate electrical energy, and an oxidizing agent supply unit 240 for supplying the oxidizing agent to the reforming unit 220 and the stack 230.

The stack 230 includes a plurality of unit cells for generating electrical energy by inducing an oxidation/reduction reaction of the reformed gas containing hydrogen gas supplied from the reforming unit 220 and the oxidizing agent supplied from the oxidizing agent supply unit 240.

Each unit cell refers to a unit cell that generates electricity, and comprises the membrane-electrode assembly for oxidizing/reducing oxygen in the hydrogen gas-containing reformed gas and the oxidizing agent and a separation plate (also called a bipolar plate, hereinafter referred to as a 'separation plate') for supplying the hydrogen gas-containing reformed gas and the oxidizing agent to the membrane-electrode assembly. The separation plate is disposed on both sides of the membrane-electrode assembly which is positioned in the center therebetween. In this case, the separation plates respectively positioned on the outermost sides of the stack are particularly referred to as end plates.

The end plate of the separation plate includes a first pipe-shaped supply pipe 231 for injecting the reformed gas containing hydrogen gas supplied from the reforming unit 220 and a second pipe-shaped supply pipe 232 for injecting oxygen gas, and the other end plate includes a first discharge pipe 233 for discharging a reformed gas containing hydrogen gas finally unreacted in the plurality of unit cells and remained to the outside and a second discharge pipe 234 for discharging an oxidizing agent finally unreacted in the unit cells and remained to the outside.

Since the separator, the fuel supply unit, and the oxidizing agent supply unit constituting the electricity generation unit are used in a typical fuel cell except that the membrane-electrode assembly 100 according to an embodiment of the present disclosure is used in the fuel cell, a detailed description will be omitted in the present specification.

MODES FOR CARRYING OUT THE INVENTION

Hereinafter, Examples of the present disclosure will be described in detail so that the present disclosure can be easily practiced by those skilled in the art to which the present disclosure pertains. However, the present disclosure may be embodied in several different forms and is not limited to the Examples described herein.

Example: Manufacturing of Polymer Electrolyte Membrane

Example 1

(1) Expanded polytetrafluoroethylene (e-PTFE) with a thickness of 10 μm and a porosity of 75% was prepared as a porous support.
(2) Nafion D2021, an ionomer dispersion, was injected into distilled water that was a dispersion medium to prepare an ionomer dispersion containing Nafion in an amount of 1% by weight.
(3) The e-PTFE support was injected into a chamber maintained at an internal temperature of 50° C. and at a 90% relative humidity (RH) of the dispersion medium atmosphere and maintained for 10 minutes so that the e-PTFE support was sufficiently wetted by the dispersion medium.
(4) Thereafter, the wetted e-PTFE support was taken out of the chamber, and the ionomer dispersion (Nafion D2021) was impregnated in the e-PTFE support, and then it was dried at 80° C. for 1 hour and heat-treated at 150° C. for 30 minutes to manufacture a polymer electrolyte membrane, which was a reinforced composite membrane with a thickness of 20 μm.

Example 2

A polymer electrolyte membrane was manufactured in the same manner as in Example 1 except that the e-PTFE support was allowed to be wetted in a chamber in which the internal temperature was maintained at 80° C.

Example 3

A polymer electrolyte membrane was manufactured in the same manner as in Example 1 except that the e-PTFE support was allowed to be wetted in a chamber in which the relative humidity (RH) was maintained at 70%.

Example 4

A polymer electrolyte membrane was manufactured in the same manner as in Example 2 except that the e-PTFE support was allowed to be wetted in a chamber in which the relative humidity (RH) was maintained at 120%.

Example 5

A polymer electrolyte membrane was manufactured in the same manner as in Example 2 except that the wetting retention time in the chamber was set to 60 minutes.

Comparative Example 1

After the ionomer dispersion (Nafion D2021) was applied to a polyethylene film that was a release film, it was dried at 80° C. for 1 hour and heat-treated at 150° C. for 30 minutes. The dried polymer membrane was detached from the release film to manufacture a polymer electrolyte membrane having a thickness of 20 μm.

Comparative Example 2

After impregnating 10 μm-thick expanded polytetrafluoroethylene (e-PTFE) (porosity 75%) with the ionomer dispersion (Nafion D2021), it was dried at 80° C. for 1 hour and heat-treated at 150° C. for 30 minutes to manufacture a polymer electrolyte membrane which was a 20 μm-thick reinforced composite membrane.

Evaluation Example: Measurement of Hydrogen Permeability of Polymer Electrolyte Membrane After manufacturing a membrane-electrode assembly (MEA) using each of the polymer electrolyte membranes manufactured in Examples 1 to 5 and Comparative Examples 1 to 2 above, the wet/dry cycles thereof were measured according to the NEDO protocol, and the results are shown in Table 1 below.

Specifically, a wet/dry cycle consisting of humidification (150% RH, 2 minutes) and drying (0% RH, 2 minutes) was repeated while injecting nitrogen gas into the anode and cathode respectively at a flow rate of 800 NmL/min at 80° C. For each 1,000 cycles, the hydrogen crossover of the MEA was measured using linear sweep voltammetry (LSV). Specifically, the current density data in the 0.4 to 0.5 V section were extracted by sweeping the 0.2 to 0.5 V section at a scan rate of 0.5 mV/s while injecting hydrogen gas into the anode at a flow rate of 200 NmL/min and nitrogen gas into the cathode at a flow rate of 200 NmL/min at 80° C. and 100% RH. The current density value of the section where the voltage is 0 was taken by linear fitting the data. After repeatedly performing the measurements up to 20,000 cycles in accordance with NEDO's mechanical acceleration endurance standard for fuel cell vehicles, the measurements were finished. However, when the hydrogen crossover measured every 1,000 cycles is 10 times or more of the initial hydrogen crossover, the evaluation is terminated in the middle, and the number of cycles performed until then was taken as the wet/dry cycle of the MEA. For example, if the hydrogen crossover measured after the end of a total of 9,000 cycles was less than 10 times the initial hydrogen crossover, but the hydrogen crossover measured after the end of a total of 10,000 cycles became 10 times or more of the initial hydrogen crossover, the wet/dry cycle of the MEA becomes "an end of 10,000 cycles".

TABLE 1

| Hydrogen crossover (mA/cm$^2$) | Example 1 | Example 2 | Example 3 | Example 4 | Example 5 | Comparative Example 1 | Comparative Example 2 |
| --- | --- | --- | --- | --- | --- | --- | --- |
| 0 cycle (Before test) | 1.5 | 1.6 | 1.6 | 1.3 | 1.4 | 2.5 | 1.9 |
| 20,000 cycles | 1.7 | 1.9 | 1.9 | 1.4 | 1.5 | 30 or more (an end of 9,000 cycles) | 3.3 |

Referring to Table 1 above, the hydrogen crossovers before and after the MEA wet/dry cycle test of the polymer electrolyte membranes according to Examples 1 to 5 were confirmed to be low compared to those of the polymer electrolyte membrane of Comparative Example 1 or Comparative Example 2. Through this, the step of wetting the porous support by first contacting the dispersion medium of the ion conductor dispersion solution with the porous support before introducing the ion conductor into the porous support is comprised so that it was confirmed that the ion conductor is impregnated up to the internal pores of the porous support to reduce the occurrence of dead pores, and the density of the ion conductor inside the pores is increased to have an effect of reducing the hydrogen crossover. This means that the wettability of the ion conductor dispersion from the surface of the support is improved, thereby having an effect of increasing the impregnation properties of the ion conductor into the pores of the support.

Hereinabove, preferred embodiments of the present disclosure have been described in detail, but the scope of the present disclosure is not limited thereto, and various changes or modified forms of those skilled in the art using a basic concept of the present disclosure defined in the following claims also fall within the scope of the present disclosure.

| Detailed Description of Main Elements |
| --- |
| 20, 20': Electrodes |
| 30, 30': Catalyst layers |
| 40, 40': Electrode base materials |
| 50: Polymer electrolyte membrane |
| 100: Membrane-electrode assembly |
| 200: Fuel cell |
| 210: Fuel supply unit |
| 220: Reforming unit |
| 230: Stack |
| 231: First supply pipe |
| 232: Second supply pipe |
| 233: First discharge pipe |
| 234: Second discharge pipe |
| 240: Oxidizing agent supply unit |

The invention claimed is:

1. A method for manufacturing a polymer electrolyte membrane, the method comprising the steps of:
    (a) preparing a porous support containing a plurality of pores;
    (b) preparing an ion conductor dispersion solution by dispersing an ion conductor in a dispersion medium;
    (c) contacting the dispersion medium with the porous support to wet the dispersion medium on the porous support; and
    (d) introducing the ion conductor to at least one surface of the porous support by applying the ion conductor dispersion solution to the porous support wetted with the dispersion medium,
    wherein step (c) is contacting a dispersion medium of a gas state with the porous support.

2. The method of claim 1, wherein the step (c) is performed in a chamber to which the dispersion medium of a gas state is supplied.

3. The method of claim 2, wherein the chamber has an internal temperature of 60° C. to 100° C.

4. The method of claim 2, wherein the chamber has an internal relative humidity (RH) of 50% to 120%.

5. The method of claim 1, wherein the dispersion medium and the porous support in the step (c) are in contact for 0.1 minutes to 60 minutes.

6. The method of claim 1, wherein the dispersion medium includes water, ethanol, isopropyl alcohol, n-propyl alcohol, butyl alcohol, N,N-dimethylacetamide, N,Ndimethyl formamide, dimethylsulphoxide, N-methyl-2-pyrolidone, triethyl phosphate, methyl ethyl ketone, tetrahydrofuran, acetone, and combinations thereof.

7. The method of claim 1, further comprising a step (e) of drying the porous support to which the ion conductor has been introduced at 40° C. to 120° C.

8. A polymer electrolyte membrane manufactured by the method according to claim 1.

9. A membrane-electrode assembly comprising:
   an anode electrode and a cathode electrode which are positioned opposite to each other; and
   the polymer electrolyte membrane according to claim 8 which is positioned between the anode electrode and the cathode electrode.

10. A fuel cell comprising the membrane-electrode assembly according to claim 9.

\* \* \* \* \*